G. H. GIBSON.
FEED WATER HEATER.
APPLICATION FILED JUNE 10, 1909.
938,573.
Patented Nov. 2, 1909.
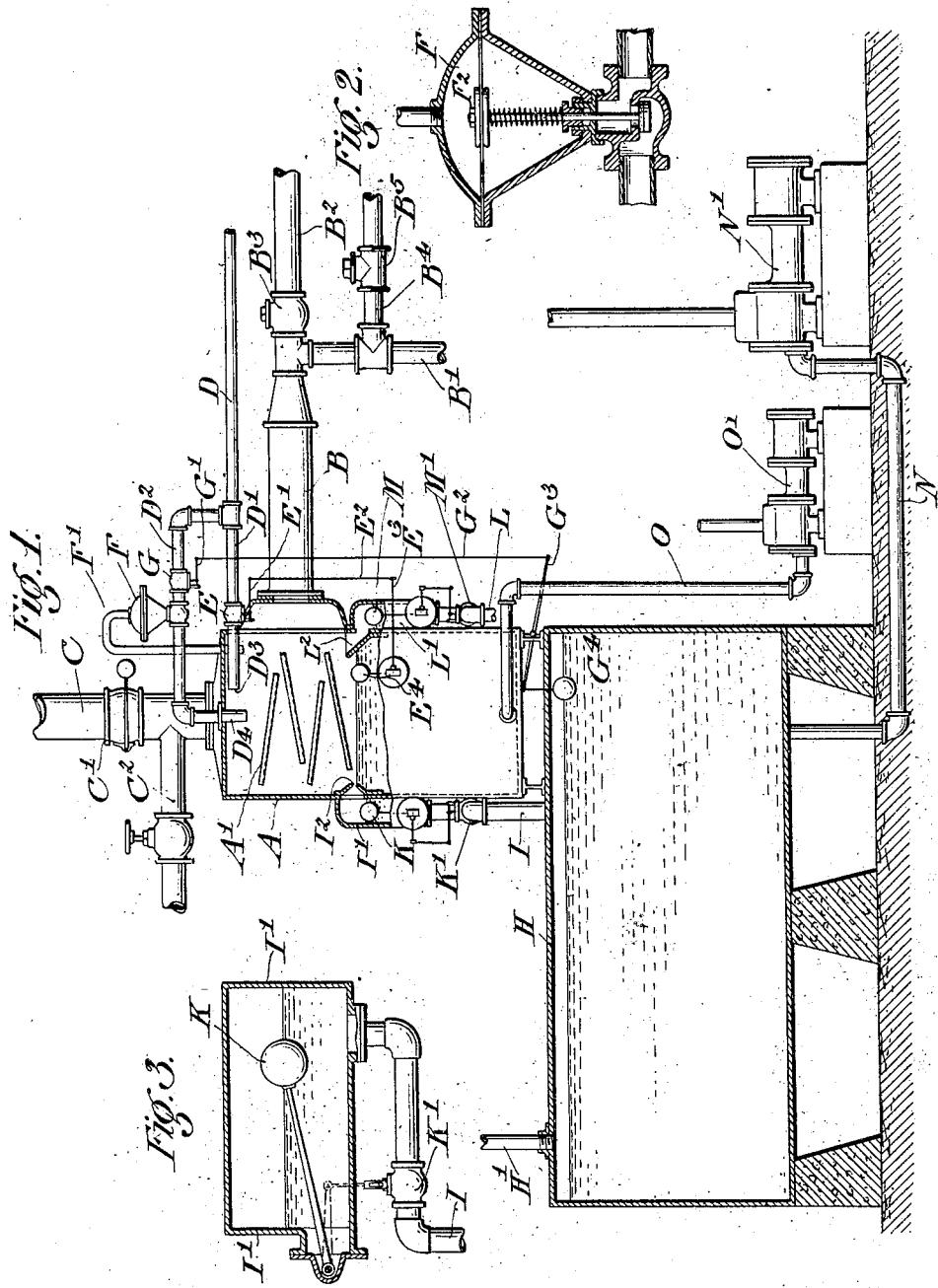
WITNESSES:
INVENTOR
BY
ATTORNEY.

UNITED STATES PATENT OFFICE.

GEORGE H. GIBSON, OF MONTCLAIR, NEW JERSEY, ASSIGNOR TO JOSEPH S. LOVERING WHARTON, WILLIAM S. HALLOWELL, AND JOHN C. JONES, OF PHILADELPHIA, PENNSYLVANIA, A FIRM.

FEED-WATER HEATER.

938,573.  Specification of Letters Patent.  Patented Nov. 2, 1909.

Application filed June 10, 1909. Serial No. 501,344.

*To all whom it may concern:*

Be it known that I, GEORGE H. GIBSON, a citizen of the United States of America, residing in Montclair, in the county of Essex and State of New Jersey, have invented a certain new and useful Improvement in Feed-Water Heaters, of which the following is a true and exact description, reference being had to the accompanying drawings, which form a part thereof.

My present invention relates to water heaters of the kind usually known as feed water heaters, in which water to be fed into a steam generating boiler, or otherwise used where warm water is necessary or desirable, is warmed by steam preparatory to such use. Usually the steam used for heating water in such heaters is entirely, or in large part, exhaust steam from steam engines, or other waste steam.

The object of the present invention is the production of a heater of the kind specified, which is simple, reliable and effective in construction and operation, and in which provision is made for normally supplying cold water to the heater to be warmed whenever the pressure of the steam in the heater rises above a predetermined amount. By this means I insure a supply of cold water to the heater which will economically utilize the heat of the steam admitted thereto. In order to obtain the best results provision should be made for storing a considerable amount of heated water. This result may be obtained by providing the heater itself with considerable storage capacity, or I may employ, in conjunction with the heater, a storage reservoir into which water may overflow from the heater whenever the water heated therein is in excess of the amount necessary to supply the immediate demand for hot water, and to maintain the desired accumulation of hot water in the heater. When I use such a storage reservoir I prefer to employ in conjunction with it means for interrupting the supply of cold water to the heater, regardless of the pressure therein, when the storage reservoir has been filled by the overflow from the heater,—the steam thereafter admitted to the heater being permitted to escape from the heater without material loss of heat until the accumulation of water in the heater or storage reservoir has been depleted.

The various features of novelty which characterize my invention are pointed out with particularity in the claims annexed to and forming a part of this specification. For a better understanding of the invention, and the advantages possessed by it, however, reference may be had to the accompanying drawings and descriptive matter in which I have illustrated and described one form of apparatus embodying my invention.

Of the drawings, Figure 1 is a diagrammatic elevation, partly in section, of the water heater and connections. Fig. 2 is a sectional elevation of a pressure regulating valve employed. Fig. 3 is a sectional elevation taken at right angles to Fig. 1, showing a portion of the pipe connections between the feed water heater and the storage reservoir.

In the drawings, A represents a tank into which the water to be heated is admitted through the pipe inlets $D^3$ and $D^4$, and flows down over the usual trays $A'$. Steam to heat the water is admitted through the pipe B. Uncondensed steam escapes from the upper end of the tank A through the pipe C which may be provided with the usual back pressure valve $C'$ set to open, under normal operating conditions, when the pressure in the tank exceeds that of the atmosphere by a few pounds.

In the form shown, $B'$ represents a pipe which may lead from the exhaust ports of one or more engines to the pipe B, and $B^2$ represents a pipe connected to the pipe B through an automatic pressure reducing valve $B^3$ which serves to reduce the pressure of steam admitted to the pipe $B^2$ to the proper degree before allowing the steam to pass into the pipe B. The pipe $B^2$ and valve $B^3$ may serve as a means for supplying live steam drawn from any suitable source. For instance, when the apparatus shown is used as a part of a locomotive roundhouse equipment, engines which are to be blown off preparatory to cleaning, may discharge their steam into the heater through the pipe $B^2$ and valve $B^3$. Where the pipe $B^2$ and valve $B^3$ are employed for admitting steam from locomotive boilers being blown off as above described, a second live steam connection $B^4$ controlled by an automatic pressure reducing valve $B^5$ may be employed. Where the two valves $B^3$ and $B^5$ are used they are preferably set to respond to different pressures in the tank A as hereinafter explained. Water accumulating in the tank A, beyond the water level shown, is normally discharged into a storage reservoir H, when the latter is employed, through a port $I^2$ chamber I' and pipe I.

K is a float in chamber I' which controls the valve K' arranged in the pipe I to normally close communication between the tank A and reservoir H except when the water begins to accumulate in the chamber I'. The valve K' and float K form a steam trap, the purpose of which is to permit, under normal conditions, of a pressure in the tank A higher than that in the reservoir H,—the latter being open to the atmosphere through the vent H'.

L represents a waste pipe through which water may flow out of the tank A through port $L^2$ and chamber L' when the reservoir H is filled, and the water level in the tank A rises, in consequence, somewhat above the water level shown. A float M and valve M' which may be identical in construction with the float K and valve K', serve to permit the pressure in the tank A to be slightly higher than that of the atmosphere under normal conditions while, at the same time, permitting the escape of water to waste when necessary. Pipe N and steam pump M' serve as a means for drawing water from the reservoir H when desired. Similarly, pipe O and steam pump O' serve as a means for drawing water directly from the tank A. In the usual installation the pump O' is a boiler feed pump.

The pipes $D^2$ and D' connected to the water inlets $D^3$ and $D^4$ may lead from separate sources of water supply or may be connected to one and the same supply pipe D as shown. The pipe D' contains a valve E which is automatically opened through suitable lever and link connections E', $E^2$ and $E^3$ by a float $E^4$ when the water level in the tank A falls to a predetermined level, and is closed when the water level rises. Valve E and its controlling mechanism thus serve as a means for insuring at all times a sufficient supply of water in the tank A to feed the pump O'. The pipe $D^2$ contains two regulating valves G and F. The valve F is a fluid pressure actuated valve automatically controlled by the pressure existing in the tank A. The pipe F' is open at its lower end to the interior of the steam space in the tank A and is connected at its upper end and to the pressure chamber $F^2$ of the valve F. This valve, as shown in Fig. 2, may be constructed in the usual manner in which fluid pressure actuated valves are constructed, and is set so that, when the pressure in the tank A rises above a predetermined amount, the valve will open and admit water to the tank A through the pipe $D^2$. When the pressure in the tank A falls, the valve F closes. The valve G is controlled through a lever and link connections G', $G^2$ and $G^3$ by a float $G^4$. This valve is normally open, but is closed when the reservoir H is filled, so that after this occurs the pressure in the tank A may then rise sufficiently to open the valve F without permitting water to flow through the pipe $D^2$. The admission of water to the tank A would then serve no useful purpose, since no advantage is obtained as the water admitted would be passed to waste.

Under all conditions of operation, steam may be supplied when necessary or desirable to heating coils (not shown) through the valved pipe connection $C^2$. To insure a supply of steam for this purpose as well as to insure a supply of steam for heating the water which it is necessary from time to time to supply to the tank through the inlet $D^3$ in order to maintain a sufficient supply for the boiler feed pump O', the pressure reducing valve $B^5$ is set to open at a pressure in the tank somewhat below that at which the fluid pressure valve F opens. To prevent the steam admitted through the valve $B^5$ from causing an accumulation of pressure in the tank A which would result in opening valve F and causing the admission of water to the tank through inlet $D^4$, the valve $B^5$ is set to close before the pressure in tank A rises from the point at which it opens to the point at which the valve F opens. The valve $B^3$ on the other hand is preferably set to maintain a pressure in the tank A somewhat above that at which the valve F opens. For while the valve $B^3$ should act to prevent the pressure in the tank A from becoming too high when a locomotive is being blow off through the pipe $B^2$, when that event happens, it is desirable that the flow through the valve $B^3$ should be comparatively rapid, and in consequence it is desirable that the valve F should then open to permit water to enter the tank through the inlet $D^4$ to effectively utilize the heat of the steam admitted.

With the construction described, it will be observed that the valve E and its connections insure at all times a sufficient accumulation of water in the tank A to supply the boiler feed pump O'. Except when the reservoir H is filled, the valve F insures the admission of water to the tank A to abstract and economically utilize the heat in the steam admitted at any instant to the tank A regardless of the water level in the tank A. This, of course, is of particular advantage on account of the intermittent manner in which the steam is sometimes supplied to the tank A. The storage reservoir H, which is preferably arranged so that it will radiate heat but slowly, serves as a means for accumulating water heated in excess of the amount of water required by the pump O. This accumulation may be drawn on when needed.

While, in accordance with the provisions of the statutes, I have herein illustrated and described the best form of my invention, it will be obvious to those skilled in the art that changes may be made in the form of the apparatus disclosed without departing from the spirit of my invention, and that some features of my invention may be used in some cases without a corresponding use of other features, and I do not intend the claims hereinafter made to be restricted more than is made necessary by the state of the art.

Having now described my invention, what I claim as new, and desire to secure by Letters Patent, is:

1. In a feed water heater, the combination with a heater tank and a steam supply connection thereto, of means directly responsive to the steam pressure in the tank for admitting water to the heater when said pressure exceeds a predetermined amount.

2. In a feed water heater, the combination with a heater tank and the usual steam supply and hot water discharge connections thereto, of means directly responsive to the steam pressure in the tank for admitting water to the heater when said pressure exceeds a predetermined amount, a storage reservoir, and connections between the heater tank and reservoir to permit water to overflow from said heater into the reservoir.

3. In a feed water heater, the combination with a heater tank and steam supply connections thereto, of a cold water supply pipe, a fluid pressure valve therein, and a conduit connecting said valve and tank whereby the valve is opened and closed in direct response to the pressure in said tank.

4. In a feed water heater, the combination with a heater tank and steam supply connection thereto, of two cold water supply passages to the tank, means for opening and closing one of said passages automatically as the water level falls and rises in said tank, and means directly responsive to the pressure in the tank for opening and closing the other water supply passage as the pressure in the tank rises and falls.

5. In a feed water heater, the combination with a heater tank and the usual steam supply and hot water discharge connections thereto, of a cold water supply connection to said tank, a storage reservoir, connections between it and the tank, through which water may overflow from the tank into the storage reservoir, two valves in said cold water supply connection, means responsive to the water level in the storage reservoir for controlling one of said valves arranged to hold said valve open except when the storage reservoir is filled, and means responsive to the pressure in the tank for opening the other of said valves when the pressure in the tank rises beyond a predetermined amount.

6. In a feed water heater, the combination with a feed water tank and the usual steam supply and hot water discharge connections thereto, of a storage reservoir to which hot water may overflow from the tank when the water level in the tank rises beyond a predetermined amount, two cold water supply connections to the tank, means responsive to the water level in the tank for opening one of said connections when the water level in the tank falls below a predetermined amount, a normally closed valve in the other cold water supply connections, means directly responsive to the pressure in the tank for opening said valve when the pressure in the tank rises beyond a predetermined amount, a second, normally open, valve in said second cold water supply connection, and means for closing said second valve when the storage reservoir is filled.

7. In a feed water heater, the combination with a heater tank and the usual steam supply and hot water discharge connections thereto, of means for normally supplying water to the tank in direct response to the pressure of steam therein, a storage reservoir and overflow connections between the tank and the storage reservoir, and a steam trap in said connection.

8. In a feed water heater, the combination with a heater tank and waste steam supply and hot water discharge connections thereto, of means for supplying cold water to the tank in response to a rise in the steam pressure therein to a predetermined point, other means for supplying cold water to the tank when the accumulation of hot water therein is diminished below a predetermined quantity, and a live steam supply connection arranged to supply steam to the tank at a pressure below said predetermined point.

GEO. H. GIBSON.

Witnesses:
WM. S. Cox, Jr.,
ROBERT G. CLIFTON.